United States Patent [19]

Chung

[11] Patent Number: 5,728,258
[45] Date of Patent: Mar. 17, 1998

[54] PORTABLE NON-GRAVITATIONAL POSITIVE PRESSURE GENERATOR AND METHOD OF USE

[75] Inventor: Jaycee H. Chung, Rockwall, Tex.

[73] Assignee: E-Systems, Inc., Dallas, Tex.

[21] Appl. No.: 573,560

[22] Filed: Dec. 15, 1995

[51] Int. Cl.⁶ .................... B29C 73/32; B30B 5/02
[52] U.S. Cl. .................. 156/580; 100/211; 156/94; 269/21; 269/22; 425/11
[58] Field of Search ..................... 156/580, 382, 156/94, 98; 425/11, 12; 100/211; 269/21, 22

[56] References Cited

U.S. PATENT DOCUMENTS

| | | | |
|---|---|---|---|
| 2,987,098 | 6/1961 | Daniel | 156/94 |
| 3,661,683 | 5/1972 | Engel et al. | 156/94 |
| 3,837,965 | 9/1974 | Mahon et al. | 156/94 |
| 4,342,707 | 8/1982 | Wengler et al. | |
| 4,475,976 | 10/1984 | Mittelstadt et al. | |
| 4,554,036 | 11/1985 | Newsom | |
| 4,595,444 | 6/1986 | Legge et al. | |
| 4,652,319 | 3/1987 | Hammond | |
| 4,744,841 | 5/1988 | Thomas | 156/98 |
| 5,207,541 | 5/1993 | Westerman | 409/179 |
| 5,234,325 | 8/1993 | Hill | 425/12 |
| 5,374,388 | 12/1994 | Frailey | |

*Primary Examiner*—Daniel Stemmer
*Attorney, Agent, or Firm*—Harold E. Meier

[57] ABSTRACT

An apparatus for applying non-gravitational pressure to a surface includes a frame structure having a longitudinal axis, a pair of connecting members coupled to the frame structure along parallel axes normal to the longitudinal axis of the frame structure, vacuum fasteners coupled to the connecting members to secure the frame structure on an underlying surface, a vacuum pump mounted on the frame structure for activating the vacuum fasteners and a positive pressure pump mounted on the frame structure for inflating a collapsible diaphragm to apply pressure to the underlying surface. The apparatus is useful for applying doublers to aircraft repair localized damage.

18 Claims, 2 Drawing Sheets

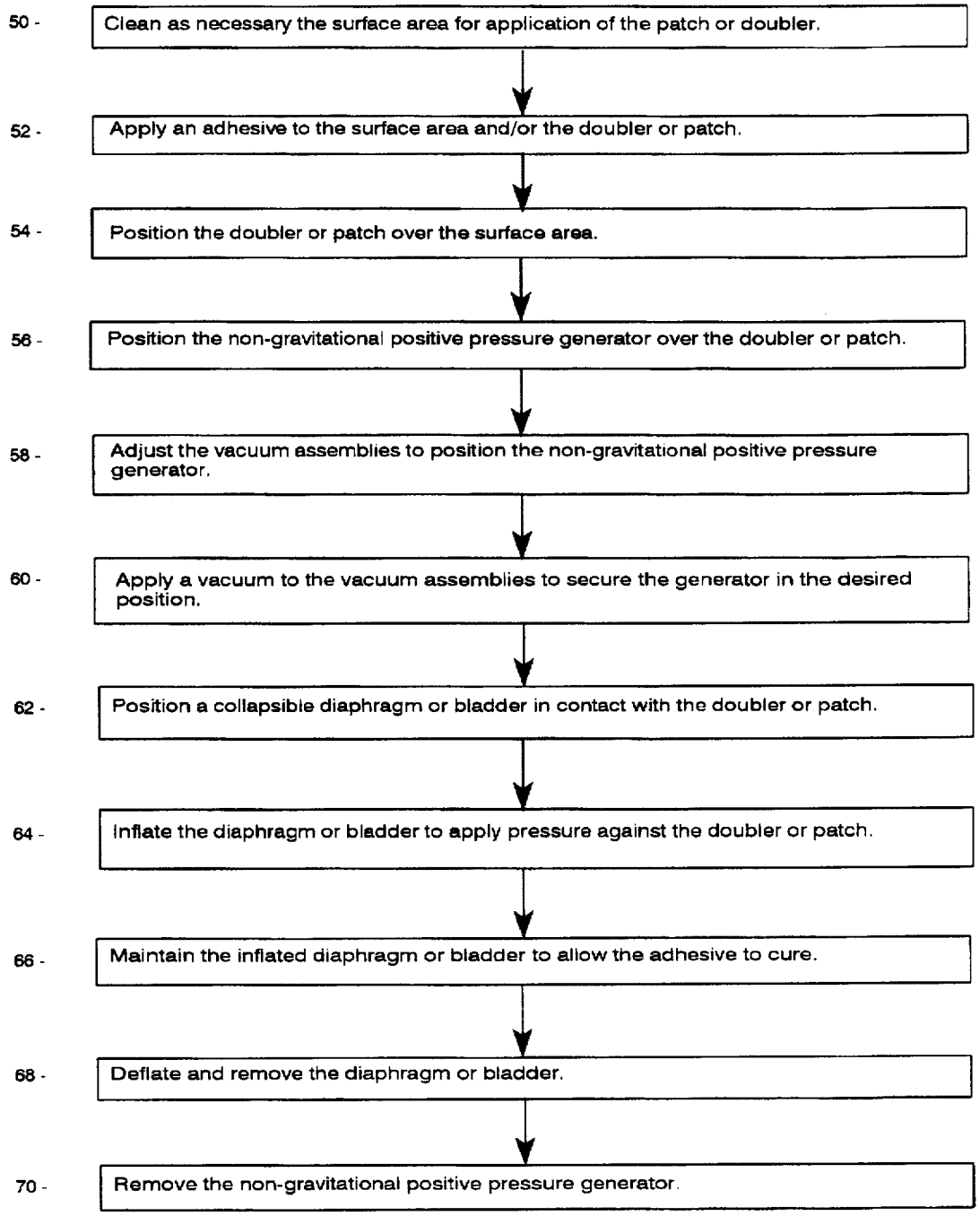

PORTABLE NON-GRAVITATIONAL POSITIVE PRESSURE GENERATOR AND METHOD OF USE

TECHNICAL FIELD

The invention relates to a portable non-gravitational positive pressure generator for use in repairing thin skinned composite or similar structures such as an aircraft fuselage.

BACKGROUND

Many modern aircraft are constructed with composite components and laminates such as bonded honeycomb structures with relatively thin skin surfaces. These thin surfaces are susceptible to being easily dented or ruptured by, for example, the impact of a bird during flight. These thin skin surfaces are also susceptible to cracking due to mechanical stresses, environmental conditions or imperfections in the materials. Once a thin skinned aircraft component has been dented, cracked or ruptured, it is necessary to repair the surface in order to prevent further damage to the component.

Advances in materials, particularly in adhesives, have permitted the repair of localized damage to thin skinned aircraft components with composite patches also known as doublers. Typically the area to be repaired is cleaned and a doubler or patch is adhesively bonded over the damaged area. However, the effectiveness of the adhesive and the integrity of the repair is often dependent upon the application of uniform pressure over the doubler for the period required to cure the adhesive. Additionally the geometry of the skin surface to be repaired may be planer, curvilinear or a combination of both requiring that the pressure be applied over a non-uniform, variable geometry.

In the past, repair of thin skinned aircraft components such as a wing or fuselage section with doublers required, in many cases, that the component be removed from the aircraft, necessitating moving the aircraft to a hangar. For example, in the case of an aircraft wing, it was necessary to demate the wing from the aircraft and place the wing in a specially constructed large steel frame. Internal support structures connected to the steel frame restrained the wing during the application of positive pressure over the surface to which the doubler was applied. Due to the different sizes and geometries of the various aircraft components, different frames were required for different components and for the same components of different aircraft. In some cases the necessary equipment to apply a doubler was not available at the site where the damaged aircraft was located. Additionally, the operation was extremely labor intensive, expensive and required extensive downtime for the aircraft.

SUMMARY OF THE INVENTION

The present invention provides a portable non-gravitational positive pressure generator for use in repairing thin skinned composite or similar structures such as an aircraft fuselage. The invention significantly reduces the amount of time, labor and equipment required to effect repairs, thereby reducing expense and aircraft downtime.

BRIEF DESCRIPTION OF THE DRAWING

FIG. 2 is a flow chart illustrating the sequence of steps in the method of the present invention.

DETAILED DESCRIPTION

Figure 1:
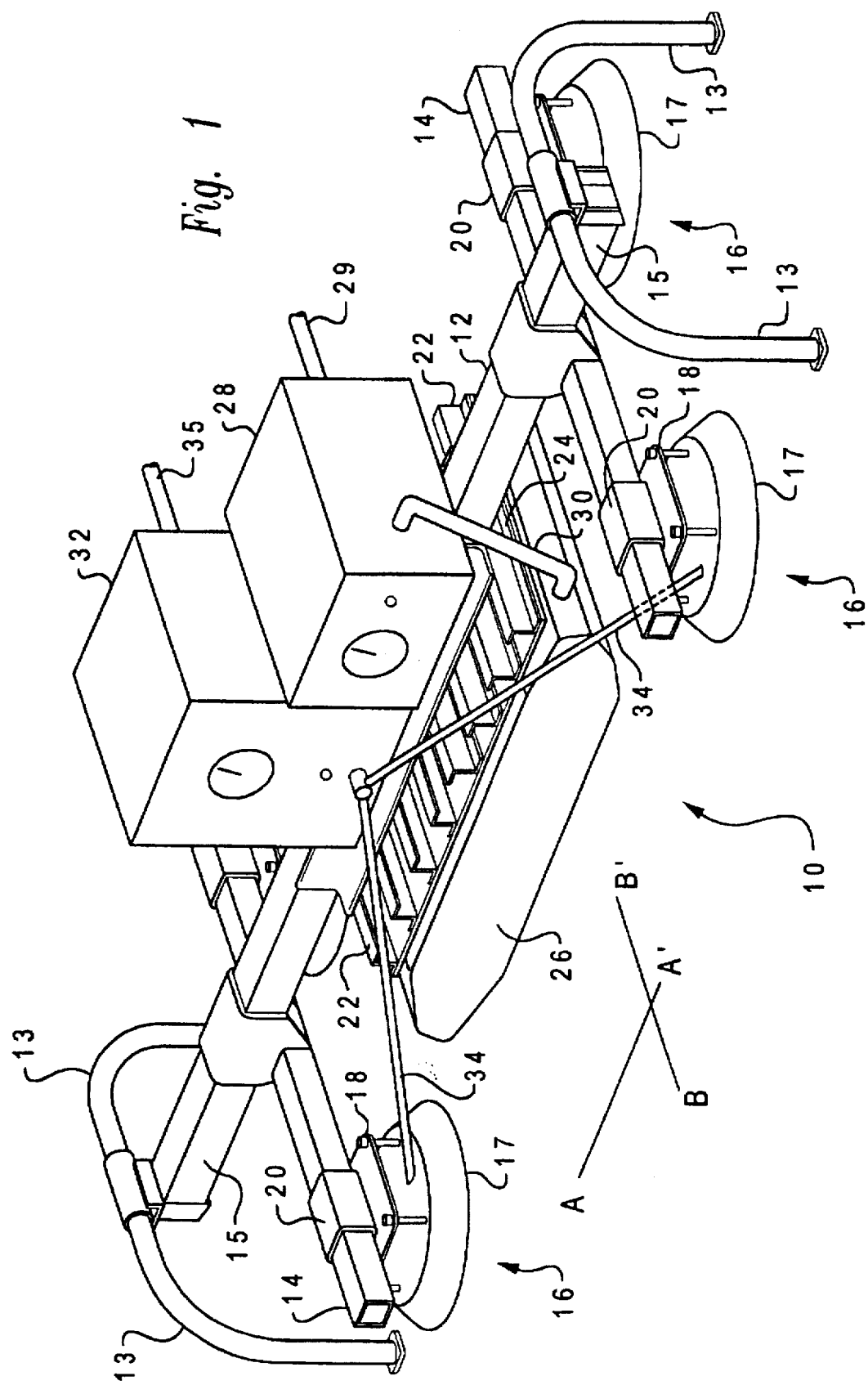
FIG. 1 is a perspective view of the portable non-gravitational positive pressure generator of the present invention.

Referring now to FIG. 1, the portable non-gravitational positive pressure generator 10 of the present invention includes a central frame member or frame structure 12 and connecting members 14. A pair of legs 13 are mounted on opposing ends 15 of the central frame member for supporting the portable non-gravitational positive pressure generator 10. The connecting members 14 may be slidably mounted on the central frame member 12 for adjustment in a longitudinal direction relative to the frame member 12 parallel to axis A—A'. The longitudinal axis of connecting members 14 intersect the longitudinal axis of central frame member 12 at an angle of approximately 90°. Central frame member 12 and connecting members 14 may be manufactured from any suitable material such as steel, aluminum or a sufficiently strong, rigid polymeric material. As illustrated, central frame member 12 and connecting members 14 are rectangular in crosssection, but it is anticipated that central frame member 12 and connecting members 14 could be tubular, hexagonal, octagonal or some other geometry.

A plurality of vacuum fastener assemblies 16 are mounted on the connecting members 14 in a generally rectangular configuration. In the embodiment illustrated in FIG. 1, two pair of vacuum fastener assemblies are coupled to a pair of connecting members 14 and positioned along parallel axes normal to the longitudinal axis of central frame member 12. The vacuum fastener assemblies 16 may be slidably mounted for adjustment in the lateral direction relative to central frame member 12 and parallel to axis B—B'. As illustrated, the vacuum fastener assemblies 16 each comprise a vacuum type suction cup 17, a mounting plate 18 and a collar 20. Vacuum suction cups 17 may be made from any suitable flexible material such as a synthetic rubber or an elastomeric polymer.

Also mounted on central frame member 12 are a series of ribs or spacers 22 that are connected to plate 24. Plate 24 provides a uniform surface against which a collapsible bladder or diaphragm 26 reacts upon inflation. Ribs 22 are sized to position plate 24 at the appropriate location relative to central member 12 and vacuum fastening assemblies 16 to enable collapsible diaphragm 26 to be inflated against an underlying surface to which the vacuum suction cups 17 have been applied.

A positive pressure pump 28 is mounted on central frame member 12 and is connected to collapsible diaphragm 26 via air line 30. Preferably, collapsible diaphragm 26 is constructed from an elastomeric rubbery material. It is however, anticipated that collapsible diaphragm 26 may be made from numerous materials known to those skilled in the art.

A vacuum pump 32 is also mounted on central frame member 12 adjacent to positive pressure pump 28. Vacuum pump 32 is connected to vacuum type suction cups 17 through vacuum lines 34. If desired, positive pressure pump 28 and vacuum pump 32 may be equipped with pressure switches, 29 and 35, respectively, for activating the positive pressure pump 28 and vacuum pump 32 to maintain predetermined levels of pressure and vacuum alleviating the need for manual switching or continuous operation of the pumps.

Referring now to FIG. 2, there is illustrated a flow chart for repairs using the portable non-gravitational positive pressure generator 10 of the present invention.

1. The surface area where the doubler or patch is to be applied is cleaned as necessary in step 50 and, if desired, an adhesive is applied during step 52 to the repair area and/or to the doubler or patch that will be used to effect the repair.

2. The doubler or patch is applied over the damaged area in step 54.
3. The portable non-gravitational positive pressure generator 10 is positioned in step 56 over the doubler or patch and the positions of the vacuum suction assemblies are adjusted if necessary during step 58.
4. The vacuum pump 32 is turned on and vacuum is applied to the vacuum suction cups 17 through vacuum lines 34 in step 60 until the portable non-gravitational positive pressure generator 10 is secured in the desired position.
5. The collapsible diaphragm or bladder 26 is positioned during step 62 between plate 24 and the doubler and connected to the positive pressure pump 28 and inflated in step 64 to the desired pressure to apply the desired amount of uniform positive pressure against the doubler.
6. The portable non-gravitational positive pressure generator 10 is maintained in position against the inflated collapsible diaphragm 26 during step 66 by the action of the vacuum suction cups for the desired period to allow the adhesive to cure, bonding the doubler to the surface to be repaired.
7. After the adhesive has cured, the collapsible diaphragm 26 is deflated in step 68 and removed in step 70.
8. If necessary, the vacuum applied to the vacuum suction cups 17 is relieved and the portable non-gravitational positive pressure generator 10 is removed.

The foregoing method of repair alleviates the necessity for demating aircraft components such as wings from an aircraft in order to effect repairs to localized areas. The foregoing method also alleviates the necessity for large complicated repair frames in which to support such components during repair. The expense, labor and aircraft downtime previously required to accomplish such repairs is also reduced.

Although the invention has been illustrated in the accompanying Drawings and described in the foregoing Detailed Description, it will be appreciated by those skilled in the art that various modifications and rearrangements of the component parts and elements of the present invention are possible without departing from the spirit and scope of the invention. The following claims are intended to cover all such modifications within the scope of the invention.

It is claimed:

1. An apparatus for applying non-gravitational pressure to a surface comprising:
    a central frame structure having a longitudinal axis;
    a plurality of connecting members adjustably mounted to the frame structure along the longitudinal axis, each connecting member having a longitudinal axis transverse to the longitudinal axis of the frame structure;
    a plurality of vacuum fasteners for coupling the frame structure to a surface, the plurality of vacuum fasteners individually mounted to the connecting members, each of said vacuum fasteners adjustable along the longitudinal axis of the connecting member;
    a vacuum pump connected to each of the vacuum fasteners for evacuating the vacuum fasteners;
    a collapsible diaphragm for applying pressure to the surface when inflated; and
    a positive pressure pump connected to said diaphragm for applying pressure thereto to inflate said diaphragm thereby applying a pressure to the surface.

2. The apparatus of claim 1 further comprising a pair of legs attached to opposing ends of the frame structure for support thereof.

3. The apparatus of claim 1 wherein the connecting members are slidably connected to the frame structure for adjustment along the longitudinal axis of the frame structure.

4. The apparatus of claim 1 wherein the vacuum fasteners are slidably connected to the connecting members for adjustment in the lateral direction relative to the longitudinal axis of the frame structure.

5. The apparatus of claim 1 wherein the vacuum fasteners comprise vacuum type suction cups.

6. The apparatus of claim 1 wherein the frame structure comprises a central frame member having a longitudinal axis intersecting the longitudinal axis of the connecting members at an angle of approximately 90°.

7. The apparatus of claim 6 further comprising two pair of vacuum fasteners for coupling the frame to the surface, the vacuum fasteners being coupled to the connecting members along parallel axes normal transverse to the longitudinal axis of the central frame member.

8. An apparatus for applying non-gravitational pressure to a surface comprising:
    a central frame structure having a longitudinal axis;
    a pair of connecting members adjustably mounted to the frame structure along the longitudinal axis, each connecting member having a longitudinal axis transverse to the longitudinal axis of said frame structure;
    two pair of vacuum fasteners for coupling the frame structure to a surface, the vacuum fasteners individually mounted to the connecting members each vacuum fastener adjustable along the longitudinal axis of the connecting member;
    a vacuum pump mounted on the frame structure and connected to each of said vacuum fasteners for evacuating the vacuum fasteners;
    a positive pressure pump mounted on the frame structure; and
    a collapsible diaphragm in contact with said central frame structure and connected to the positive pressure pump for applying a positive pressure to a surface when inflated.

9. The apparatus of claim 8 further comprising a pair of legs attached to opposing ends of the frame structure for support thereof.

10. The apparatus of claim 8 wherein the connecting members are slidably connected to the frame structure for adjustment along the longitudinal axis of the frame structure.

11. The apparatus of claim 8 wherein the vacuum fasteners are slidably connected to the connecting members for adjustment in the lateral direction relative to the longitudinal axis of the frame structure.

12. The apparatus of claim 8 wherein the vacuum fasteners comprise vacuum type suction cups.

13. The apparatus of claim 8 wherein the frame structure comprises a central frame member having a longitudinal axis intersecting the longitudinal axis of the connecting members at an angle of approximately 90°.

14. The apparatus of claim 8 wherein the two pair of vacuum fasteners couple to the connecting members along parallel axes transverse to the longitudinal axis of the central frame member.

15. An apparatus for applying non-gravitational pressure to a surface comprising:
    a central frame structure having a longitudinal axis;
    a plurality of ribs extending downwardly from the central frame structure, each of the ribs having a longitudinal axis normal to the longitudinal axis of the frame structure;

a plurality of vacuum fasteners for mounting the frame structure to a surface, the plurality of vacuum fasteners individually mounted to the connecting members, each of said vacuum fasteners adjustable along the longitudinal axis of the connecting member;

a vacuum pump connected to each of the vacuums fasteners for evacuating the vacuum fasteners;

a collapsible diaphragm in contact with the plurality of ribs for applying pressure to the surface when inflated; and a positive pressure pump connected to said diaphragm for applying pressure thereto to inflate said diaphragm thereby applying a pressure to the surface.

16. The apparatus of claim 15 further comprising a pair of legs attached to opposing ends of the frame structure for support thereof.

17. The apparatus of claim 15 wherein the connecting members are slidably connected to the frame structure for adjustment along the longitudinal axis of the frame structure.

18. The apparatus of claim 15 wherein the vacuum fasteners are slidably connected to the connecting members for adjustment in the lateral direction relative to the longitudinal axis of the frame structure.

* * * * *

UNITED STATES PATENT AND TRADEMARK OFFICE
CERTIFICATE OF CORRECTION

PATENT NO.  : 5,728,258
DATED       : March 17, 1998
INVENTOR(S) : Jaycee H. Chung It is certified that error appears in the above-identified patent and that said Letters Patent is hereby corrected as shown below:

TITLE PAGE, ITEM
[56] References Cited, line 4, delete "4,342,707", insert --4,352,707--

[56] References Cited, line 4, after "4,352,707", delete "8/1982", insert --10/1982--.

[57] Abstract, line 12, after "aircraft", insert--components--.

Column 4, line 16, after "fasteners", delete "being"

Column 4, line 17, after "axes", delete "normal".

Signed and Sealed this

Fourth Day of August, 1998

Attest:

Attesting Officer

BRUCE LEHMAN

Commissioner of Patents and Trademarks